Aug. 29, 1950
M. STEINSCHLAEGER
2,520,860
PROCESS FOR THE PRODUCTION OF WATER
GAS AND LIKE SYNTHESIS GASES
Filed Aug. 6, 1945
2 Sheets-Sheet 1
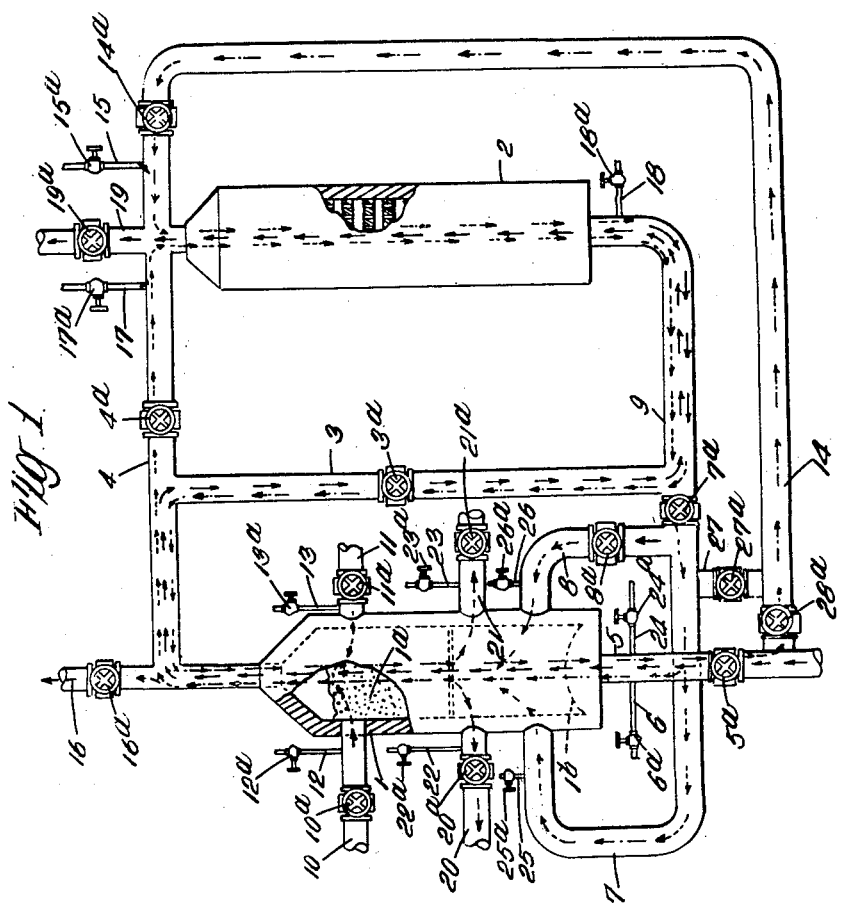
Inventor,
Michael Steinschlaeger
By Young, Emery, Thompson
Attys.

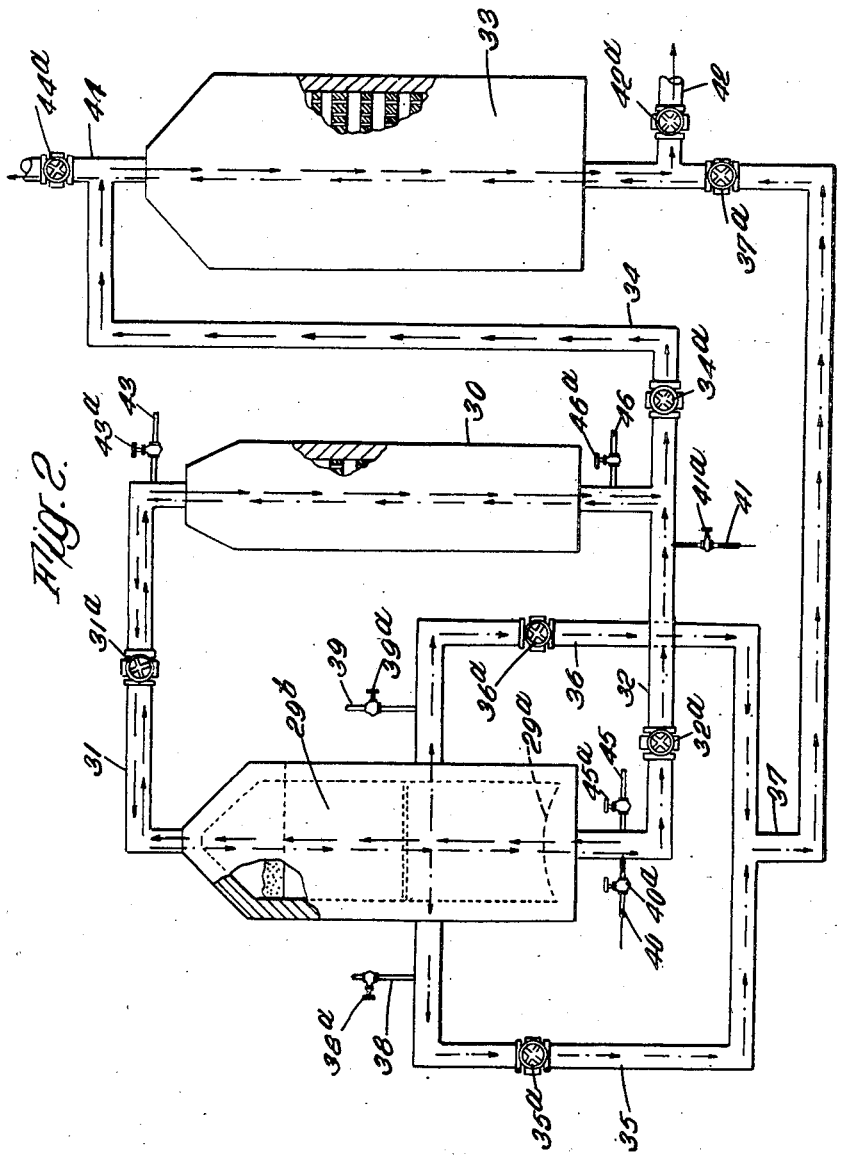

Patented Aug. 29, 1950

2,520,860

UNITED STATES PATENT OFFICE 2,520,860

PROCESS FOR THE PRODUCTION OF WATER GAS AND LIKE SYNTHESIS GASES

Michael Steinschlaeger, London, England

Application August 6, 1945, Serial No. 609,235
In Great Britain September 15, 1941

5 Claims. (Cl. 48—205)

This invention relates to a process for the production of water gas and like synthesis gases, all of which are hereinafter referred to as water gas and is a continuation-in-part of my application Serial No. 455,649, now abandoned.

In the discontinuous process of producing water gas a large amount of time and a high proportion of high quality fuel is used for heating the generator during the blowing period to the temperature required for the reaction and to make the process practically possible an extensive decrease of temperature in the generator bed must take place.

If on the other hand a continuous process is used with re-cycling of gases to bring the generator bed to the required temperature the gases which leave the generator have a very high temperature particularly if such fuels as high temperature coke are employed and very large volumes of gas must be re-cycled and a considerable amount of high quality coke is not converted into water gas and is found in the ash.

It is an object of the present invention to overcome these disadvantages.

The present invention provides a discontinuous process for the manufacture of water gas which comprises subjecting a generator containing a carbonaceous fuel bed to blowing with an oxygen-containing gas, heating a regenerator by passing a hot gas therethrough, and during the make run splitting the made gas issuing from the generator into two streams, mixing with one of said streams at least one substance selected from the group consisting of steam and carbon dioxide, and passing the mixture thus obtained through the regenerator and then into the generator.

The steam may be replaced wholly or in part by carbon dioxide and instead of heating the regenerator by means of the blow gases it may be heated by some other hot gas such as gas from a producer gas plant.

Coke oven gas or other gas rich in methane may be added to the mixture of water gas and steam and/or carbon dioxide passed into the heated regenerator.

When manufacturing synthesis gas according to the process of the present invention one or more hydrocarbons will be added to the mixture of water and steam and/or carbon dioxide passed into the heated regenerator.

The process of the invention is also applicable to the manufacture of carburetted water gas and in this case oil is injected into a part of the gases leaving the generator in a gas making period while the gases have sufficient sensible heat to evaporate the oil, the remainder of the said gases being recycled to the regenerator.

It will be understood that any other gases necessary for the reaction may be added to the mixture. Thus for example additional steam may be introduced if required. Furthermore if a normal blue water gas or a water gas more rich in hydrogen is to be produced steam will be a necessary ingredient with or without carbon dioxide whilst if the water gas to be produced is to be rich in carbon monoxide, carbon dioxide will be a necessary ingredient with or without steam.

It will be seen from the above that by allowing the same temperature decrease as is usual in the well known discontinuous processes a considerable increase in the time of the "gas making" period is obtained; for this reason it is possible to allow in the process of the present invention a smaller decrease in the temperature in the generator bed and resulting from this a considerable increase in the capacity of the generator can be achieved in practice.

The fuel employed in the generator is coal, coke or other solid or liquid carbonaceous fuel, preferably high temperature coke. The producer gas plant may use fuel of the same type as the generator, or other solid, gaseous or liquid fuel may be used.

The invention will now be further described by way of example with reference to the accompanying drawings, in which—

Fig. 1 is a view partly in section and partly in elevation of an apparatus for manufacturing water gas, carburetted water or synthesis gas by the process of the present invention, and Fig. 2 is a similar view of a modified apparatus.

Referring to Fig. 1 of the drawings, a generator 1 having a reaction zone 1a and a grate 1b is connected to the bottom of a regenerator 2 by a pipe 3 controlled by a valve 3a and to the top thereof by pipe 4 controlled by valve 4a. The generator 1 is also provided with an inlet pipe 5 controlled by valve 5a having a branch 6 controlled by valve 6a and a branch 24 controlled by valve 24a as well as further pipes 7 and 8 controlled by valves 7a and 8a respectively and connected to the bottom of the regenerator 2 by pipe 9. At the top of the reaction zone pipes 10 and 11 having branches 12 and 13 respectively and controlled by valves 10a, 11a, 12a and 13a are provided. A pipe 14 controlled by valves 14a and 28a and having a branch 15 controlled by valve 15a joins the bottom of the generator to the top of the regenerator whilst two pipes 16 and 17 controlled respectively by valves 16a and 17a are joined to the pipe 4 and pipe 18 controlled by valve 18a to the pipe 3. The regenerator 2 is provided with an outlet-pipe 19 controlled by valve 19a. The generator 1 is also provided with outlet pipes 20 and 21 controlled by valves 20a and 21a respectively, said pipes being connected thereto by pipes 22 and 23 controlled by valves 22a and 23a respectively. Pipes 25 and 26 controlled by valves 25a and 26a respectively joined to pipes 7 and 8 respectively are also provided for other purposes hereinafter specified. A connecting pipe 27 controlled by valve 27a is also provided between the pipes 9 and 14.

In Fig. 1 of the drawings, the full lines show the path of the gases in a blowing period, the dotted lines show the path of the gases in an up gas making period and the dot and dash lines show the path of the gases in a down gas making period.

In the manufacture of water gas the apparatus is operated as follows: Air is admitted to the generator 1 through pipes 6 and 5 with the valve 5a closed. The blow gases formed in the reaction zone 1a pass via pipe 3, the valve 3a being open, into the bottom of the regenerator 2 which is heated thereby. The blow gases leave through the pipe 19, the valve 19a being open. Secondary air may be admitted if desired through pipe 18. Purging is effected by admitting steam through pipe 24 the gases passing via pipe 3 and regenerator 2 to the pipe 19.

Gas is now made in the down direction by introducing steam through the pipe 15, the valve 15a being open, whence it passes downwardly through the regenerator 2 and thence via the pipe 3, the valve 3a being open, to the top of the generator 1. Part of the gases produced leave via pipes 20 and 21 the valves 20a and 21a being open and the remainder is recycled to the regenerator 2 by the pipe 14, the valve 14a now being open.

Gas is now made in the up direction by introducing steam via the pipe 17, the valve 17a being open (the apparatus containing water gas from the down gas making period) into the regenerator 2 whence it passes through the pipe 9 to the pipes 7 and 8, the valves 7a and 8a being open, into the bottom of the generator 1. Additional steam is introduced through pipe 24 the valve 24a being open. A part of the gases produced leaves the generator via pipes 10, 11 and 16, the valves 10a, 11a and 16a being open and the remainder is recycled via the pipe 4 to the regenerator 2.

The process may be modified for the production of carburetted water gas as follows:

The blow period is carried out as described above. In the down gas making period oil is injected through pipes 22 and 23 into the water gas leaving through pipes 20 and 21 respectively. In the up gas making period oil is injected through the pipes 12 and 13 into the water gas leaving through pipes 10 and 11 respectively.

In the manufacture of synthesis gas hydrocarbon gas is injected through the pipes 25 and 26 in the down gas making period, the gases produced passing via the pipes 7 and 8 to the pipe 27 and then to the pipe 14 to the top of the regenerator, steam being admitted through pipe 15. The gases are cracked in the regenerator and then pass via pipes 9 and 3 to the top of the generator 1. A part of the gas leaving the reaction zone is recycled via pipes 7 and 8 after injection of hydrocarbons through pipes 25 and 26 and the remainder is removed through pipe 5.

Referring to Fig. 2 of the drawings, a generator 29 having a reaction zone 29b and a grate 29a is connected to the top of a regenerator 30 by a pipe 31 controlled by valve 31a and to the bottom thereof by a pipe 32 controlled by valve 32a. The apparatus also includes a superheater 33 the top of which is connected to the bottom of the regenerator 30 by the pipe 34 controlled by valve 34a. The generator 29 has two outlet pipes 35 and 36 controlled respectively by valves 35a and 36a. These pipes unite in pipe 37, controlled by valve 37a, which pipe is connected to the bottom of the superheater 33. Two oil inlet pipes 38 and 39 controlled respectively by valves 38a and 39a lead respectively to pipes 35 and 36. The generator 29 also has an air inlet pipe 40 controlled by valve 40a and a steam inlet pipe 45 controlled by valve 45a. A further pipe 41 controlled by valve 41a is connected to pipe 32, outlet pipes 42 and 44 controlled by valves 42a and 44a respectively are provided on the superheater, a secondary air pipe 43 controlled by valve 43a is connected to pipe 31 and an outlet pipe 46 controlled by valve 46a is provided on the regenerator 30.

In Fig. 2 of the drawings, the full lines show the path of the gases in a blowing period and the dot and dash lines show the path of the gases in a down gas making period.

In the manufacture of carburetted water gas the apparatus is operated as follows: Air is admitted to the generator 29 through pipe 40 with valve 32a closed. The blow gases formed in the reaction zone 29a pass via pipe 31, the valve 31a being open (secondary air being added through pipe 43, valve 43a being open), into the top of the regenerator 30 which is heated thereby. The blow gases leave through the pipe 34, the valve 34a being open, and pass into the top of the superheater 33 which is heated thereby. The blow gases leave the apparatus through the pipe 42, valve 42a being open. Purging is effected by admitting steam through pipe 45, the gases passing through pipe 31 and regenerator 30 to pipe 46.

Gas is now made in the down direction by introducing steam through the pipe 41, the valve 41a being open and the valve 34a closed. The steam passes up the regenerator 30, then through pipe 31, the valve 31a being open, to the top of the generator 29. Part of the gases produced leave through pipes 35 and 36, oil for carburetting being admitted through pipes 38 and 39, the valves 35a, 36a, 38a and 39a being open. The carburetted gas thus produced leaves through pipe 37, the valve 37a being open and valve 42a closed and thence passes through the superheater 33, which it leaves through pipe 44 the valve 44a being open. The remainder of the gas produced in generator 29 is recycled via pipe 32, regenerator 30 and pipe 31.

The following modifications of the usual process which are of considerable value can be effected by using the process of the present invention.

1. If a higher temperature is desirable in the generator and the blow gases contain a very high proportion of carbon monoxide these blow gases can be used to heat the regenerator.

2. If it is desirable to use still less coke of a larger size the blowing of the generator can be effected with a mixture of producer gas or other available gases and air or pre-heated air and the blow gases which will be in this case rich in carbon monoxide can be utilised for heating the regenerator.

3. Should it be necessary by using normal temperatures in the generator to cool the ash the re-cycle gases with the addition of the steam necessary for the reaction can be brought into the generator above the grate. This procedure will in any case be necessary in the period of "up" gas making if high temperatures are to be avoided on the grate.

4. If a generator system is used in which the ash leaves the generator in a fluid condition (by using very high temperatures in the generator) the blow gases contain a very high proportion of carbon monoxide and are used for heating the regenerator. In this case the capacity of the generator is very high and the blow gases are sufficient to provide the greater part of or all the heat necessary for the heating of the regenerator. Should the blow gases have too low a calorific value for the achieving of the high temperature required some water gas or other gases of high calorific value can be added to the blow gases or a part of the heat can be taken from the generator bed.

In this case not much of the fuel of low calorific value can be used but the total fuel consumption of coke is less than by the well known processes. This form of producing the gases is most suitable for production of synthesis gases from methane-containing gases.

Furthermore, when using such a generator system in which the ash leaves the generator in fluid form another regenerator is used for pre-heating the air or all or a part of the gases can be produced in the down gas making period and the heat stored in the ash and clinker for pre-heating the air. In this case the pre-heat temperature of the re-cycle gases used in the up gas making period is practically the same as or higher than the highest temperature of the ash and clinker. The heating of the regenerator for pre-heating air is accomplished with the sensible heat of the water gas leaving the generator.

5. If not very high temperatures are desirable in the regenerator a part of the heat to pre-heat the re-cycle gases can be taken from the generator bed; on the other hand it may be advantageous to blow the generator at a lower temperature than the temperature of the re-cycle gases, or it may be desirable to change the temperature of the re-cycle gases within a gas making period so as to achieve the most advantageous temperatures in the regenerator and the generator.

6. If oxygen is used instead of air for the production of water gas or synthesis gases the application of the above-mentioned process results in a saving of oxygen.

7. It is possible by the application of the process of this invention advantageously to produce such gases as carburetted water gas, carbon monoxide-rich, hydrogen-rich, nitrogen-rich, etc. gases and also gases with very low content of inert constituents, because of the great flexibility of the process of the invention.

In producing carburetted water gas it is possible by using the process of this invention to achieve a considerably higher temperature in the gases leaving the generator than is usually achieved by other processes. The operation of the generator is then as follows: The whole or the greater part of the gases is produced in the up gas making period. This will allow of the injection of the oil and the evaporation of the same in the gas (without using a carburettor).

The following modifications and some suitable conditions of practical operation which are of considerable value can be effected by using the process of the present invention. In producing blue water gas or similar gases it is advantageous in the down gas making period to store as much heat as possible in the ash and clinker, so that in the following up gas making or blow period the heat so stored is utilised in the steam or re-cycle gases and steam or the air required for blowing. The coke is advantageously charged before the up gas making period begins so as to pre-heat partly or wholly the coke with the gases leaving the generator. The pre-heating of the coke to still higher temperatures can be achieved with the blow gases leaving the reaction zone (if necessary by the addition of secondary air). The ratio between the amount of the gases made in the down and up gas making periods should be regulated according to the temperatures desired in the gases leaving the generator. For heating the regenerator the heat in the blow gases is used and as it is not necessary to use so much re-cycle gases this heat is sufficient to heat the regenerator and provide steam for the reaction and surplus steam. The amount of surplus steam available can be regulated by the variation of the pre-heat temperature of the gases leaving the regenerator and, of course, by the composition and amount of the blow gases. The sensible heat of the water gas and steam leaving the generator is used for production of steam in the gas making cycle (thus utilising the capacity of the available boiler in the gas making period and saving in cooling water for the cooling of the gases).

The pre-heat temperatures of the re-cycle gases in the down and up gas making periods may advantageously differ (for example lower in the up gas making period). The motive power for the re-cycle gases is preferably steam or other gases necessary for the reaction used in an injector.

The following examples illustrate how the process of the invention may be carried into effect:

1. 0.45 kgm. of steam having a temperature of about 120° C. was mixed with 2.5 cubic metres of water gas and the mixture was pre-heated in a heat exchanger (which was heated by re-cycle gases coming from the generator) and then passed to a regenerator the temperature of which had been raised to 1300° C. by burning producer gas generated in a producer gas plant. The mixture of steam and water gas was then introduced into a generator to produce water gas. The generated and the re-cycled water gas (3.5 cubic metres in all) left the generator at a temperature of 750° C. and was then cooled to 150° C. (the heat extracted was used for pre-heating the re-cycle gases and steam) and 2.5 cubic metres of the water gas were re-cycled.

It is to be noted that by using a producer gas plant the producer gas is used as it comes from the plant with a high temperature and the air used in the producer plant and in the combustion in the regenerator was pre-heated with the waste gases from the combustion process. The same procedure can be applied by using other gases. In that case the gas and the air used for combustion are then pre-heated with the waste gases.

It was found that the consumption of coke of a size about 1½" (calorific value 7150 K. cal. per kgm.) was 310 kgms. in addition to 210 kgms. of coke of a size under 1" (calorific value 5400 K. cal. per kgm.) per 1000 cubic metres of blue water gas produced whilst the output of the generator per unit of time was considerably increased.

2. 0.5 kgm. of steam having a temperature of about 150° C. was mixed with 2 cubic metres of water gas and the mixture was superheated in a regenerator the temperature of which had been raised to 1100° C. by burning producer gas generated in a producer gas plant. The mixture of steam and water gas was then introduced into a generator to produce water gas. The generated and the re-cycled water gas (3 cubic metres in all) left the generator at a temperature of 450° C. and was then cooled to 150–200° C. (the heat extracted was used for producing steam and electric current for the process) and 2 cubic metres of the water gas were re-cycled.

It was found that the consumption of coke of a size about 1½″ was 265 kgms. in addition to 235 kgms. of coke of a size under 1″ per 1000 cubic metres of water gas produced whilst the output of the generator per unit of time was considerably increased.

3. 0.5 cubic metres of re-cycle gases and the necessary amount of steam are injected into the superheater (carburettor), pre-heated to the required temperature and introduced into the generator (in this case the temperature of the pre-heated gases is about 1050° C. and the gases will be introduced above the grate). The gases leaving the reaction zone have a high temperature (average 1175° C.), this temperature can be substantially the same when the gases leave the generator. This is achieved by blowing the generator before the up gas making period and heating the coke, which was charged between the up gas making and the blow periods. From this gas leaving the generator (1.0 and 0.5 cubic metres= 1.5 cubic metres) having in this example a temperature of 1000° C., 0.5 cubic metre is re-cycled by using an injector the motive power for which is steam necessary for the reaction.

The mixture is pre-heated in the regenerator (regenerator previously heated by blow gases) the gases are introduced into the generator above the grate. The 1 cubic metre of the water gas having a temperature of 1000° C. is mixed (by injection of oil) with the oil or tar which evaporates and the average temperature of the gases and oil vapours amounts to 500° C. This mixture is then sent to the superheater where the mixture is heated to the necessary temperature for the complete cracking of the oil and to produce the required carburetted water gas. The amount of the oil used in the above mentioned example is 2.6 gallons per 1000 cubic feet of carburetted water gas, if 3 gallons are used the temperature of the mixture will be about 440° C. By using pre-heated oils or distillation oil gases or tars or tar gases it is possible to use a still smaller sized superheater or even no superheater at all. The same results can be achieved by increasing the temperature of the gases leaving the generator still more or by increasing the sensible heat of these gases by using more excess steam than is normally necessary for the reaction or using more re-cycle gases.

The sensible heat of the carburetted water gases leaving the superheater is used for steam production in the gas making period.

In certain circumstances it may be advantageous to operate the generator with high reaction temperatures. The operation of the generator is then preferably as follows: The whole of the gas is made in the up gas making period. The gases leaving the generator have a very high temperature and the sensible heat of these gases can be still further increased by increasing the excess above the normal of the steam necessary for the reaction. It will then be possible to achieve the evaporation and the cracking of the oil without using a carburettor and superheater. The carburettor and superheater are then used for pre-heating the re-cycle gases, steam and air necessary for the reaction.

The above mentioned modification can be used for making carburetted water gas without a superheater or with a superheater when very high temperatures are required for cracking the oils, tars, pitch, etc., utilising oils, tars, pitches, etc., which are difficult to crack or require higher cracking temperatures than the oils normally used.

4. This example illustrates the use of a generator in which the ash leaving the generator is in fluid form.

a. *Gas making period.*—0.5 cubic metre of re-cycle gases and 0.9 kg. of steam per cubic metre of gas produced are brought into the generator (average temperature in the reaction zone 1500° C.) with a pre-heat temperature of 1500° C. The sensible heat of the gases leaving the generator is used in the following way: The sensible heat of 1.0 cubic metre of gas +0.333 kgm. of steam are used for the evaporation and cracking of the oil (5 gallons per 1000 cubic feet) and the temperature of the mixture is 770° C. 0.5 cubic metre of gas and 0.162 kg. of steam are used to heat the carburettor (the carburettor is used in the following blow period for the pre-heating of the air used for blowing to a temperature in this example of 900° C.), after leaving the carburettor this re-cycle gas is mixed with 0.6 kgm. of steam (used in an injector) and brought into the superheater (used as a regenerator) for pre-heating the mixture to 1500° C. and then brought into the generator.

b. *Blow period.*—Air is blown through the regenerator into the generator. The blow gases leaving the reaction zone pre-heat the coke and are then used for heating the super-heater (in this case used as a regenerator) to the temperature required. The coke consumption in using this modification is low in spite of the high temperatures of the gases and the undecomposed steam leaving the generator and the capacity of the generator is very high.

In the production of hydrogen-rich gases it is possible to operate the generator with practically very low temperatures without decreasing the capacity of the generator to a very low level so that the process is very suitable for production of hydrogen-rich gases. If a high capacity of the generator is desirable it is possible to use high temperatures and a large excess of steam without unduly increasing the coke consumption. In this case a part of the steam not used in the reaction is always re-cycled back with the gases injected into the generator. If a further conversion plant is used for production of still more hydrogen the gases and undecomposed steam can be sent direct to the conversion plant and the temperature of the mixture can be adjusted by the operation conditions of the generator.

By using coke oven gas or other methane containing other gaseous or liquid hydrocarbons particularly residual gases from the oil synthesis or other synthesis processes or hydrogenation processes, the heat in the decomposed gases and the undecomposed steam (from the decomposing chamber or regenerator) are used for the reaction in the generator (the temperature in the regenerator is dependent on the degree of the decomposition required or whether catalysts are used for the decomposing reaction and the composition of the synthesis gas). The inert content of the synthesis gases can be regulated by taking out a part of the residual gases from the process. The blow gases are used for heating the regenerator to provide the heat necessary for the decomposition reaction and to heat the steam and the gases used in the reaction. The excess of steam for the decomposing reaction is preferably so high that the undecomposed steam leaving the regenerator is for the greater part or wholly sufficient for the later reaction in the generator. If the blow gases are not sufficient to provide the whole heat for the reaction in the regenerator residual gases or other fuels can be added. If the ratio of methane containing gases, steam or other gases used for the reaction is too high, so that the heat which must be stored in the regenerator is consequently also too high it is preferable, so as to avoid too large sized regenerators to use two regenerators. The operation when using two regenerators is as follows: Heating of the regenerator, (1) In the blow period with the blow gases and additional fuels. (2) In the gas making period with additional fuels. At the same time the other generator is used for the reaction and heating.

The above mentioned modification for production of synthesis gases applies to the production of gases with a ratio of $CO:H_2=1:2$ and more hydrogen and allows of the production of gases with a ratio of $CO:H_2=1:1$ and less hydrogen (the CO-rich gases are used for production of primary products rich in olefines).

If a high decomposition temperature is used in the regenerator and no such high temperature is desirable in the generator (low fusion temperature of the ash or production of hydrogen-rich gases, etc.), the temperature can be regulated by addition of steam or other gases necessary for the reaction.

The depth of the reaction zone, the coke ash and clinker bed should be varied according to the reaction taking place or the gas composition required, so as to achieve the most advantageous results and conditions.

The re-cycle gases, steam, air and other gases and fuels necessary for the reaction, when having low temperatures are introduced into the generator in the same way as in known constructions of generators. By using the gases with high pre-heat temperatures but not so high as the reaction temperature, the gases are introduced into the generator in such places that they can be pre-heated with the heat stored in the ash, clinker, coke, coal or lining of the generator. By using the above mentioned gases with the same or higher temperatures as the reaction temperature the gases should be brought in places having the same or the highest temperatures in the generator. This is all provided that some other considerations do not require other conditions of operation such as a part of the heat in the re-cycle gases being stored, etc.

The steam necessary for the reaction and the surplus steam can be produced in the generator plant or if steam is available from other sources the coke consumption can be decreased.

In some cases it may be advantageous to blow the generator up and down, using so the heat stored in the coke, clinker and ash for air pre-heating or for further pre-heating of the re-cycle gases and/or steam. The ratio of the air used in the down and up blowing is dependent on the amount of the heat which it is desirable to store.

Instead of air in the blow period it is sometimes advantageous to use oxygen in the blow period. The gases leaving the generator in the blow period are, preferably after washing out carbon dioxide, mixed with the gases produced in the gas making period. If the gases produced in the blow period are mixed without washing out carbon dioxide, the amount of carbon dioxide in the mixture can be regulated by the ratio between steam, or other gases and oxygen used in the blow period. The sensible heat of the gases leaving the generator in the blow period is used for heating the regenerator.

In order to use the same connection for both the up and down gas making periods for bringing th re-cycle gases into the bottom or the top of the generator, two injectors working in different directions disposed between the connection pipes are used.

The invention has a number of advantages. Thus, for example:

1. The process uses less fuel.
2. It is possible to use a part of the fuel in the form of low quality fuel (such as coke of smaller size).
3. The production capacity of the water gas generator is considerably increased owing to the shorter blowing times and the longer time during which the temperature in the water gas generator is high enough to allow of the making of gas.
4. The efficiency of the process is increased to between 75 and 80% and the capacity of the plant is increased by between 50 and 150%.

The advantages of the present invention are illustrated by the following calculations:

*Calculation of the temperature of the gases leaving the generator using re-cycle gases*

The following conditions are assumed:
1. Production of water gas in the generator per cycle: 500 cubic metres.
2. Amount of re-cycle gases per cycle: 500 cubic metres.
3. The average temperature in the reaction zone equivalent to the temperature of the gases and undecomposed steam leaving the same reaction zone: 1200° C.
4. Theoretical steam consumption for production of 500 cubic metres of $CO+H_2$: 202.5 kgs.
5. Practical steam requirement for production of 500 cubic metres of water gas: 252.5 kgs.
6. Steam in the 500 cubic metres of re-cycle gases: 50 kgs.

The sensible heat in the gases leaving the reaction zone (500 cubic metres of produced water gas+500 cubic metres of re-cycle gases+100 kgs. of steam):

$$1000 \times 1200 \times 0.532 + 100 \times 1200 \times 0.524 =$$
$$400,000 + 63,000 = 463,000 \text{ K. cal.}$$

Assuming that 53,000 K. cal. are used for preheating the coke (the whole amount used for pre-heating the coke in this case is 110,000 K. cal. and is partly provided by the blow gases) the sensible heat of the gases leaving the generator amounts to 410,000 K. cal. or the average temperature of the gases before entrance to the regenerator (or before mixing with steam and/or hydrocarbons) is 1080° C. Half of these gases is used as re-cycle gas and is mixed before entering the regenerator with 252.5 kgs. of steam (120° C.) the total amount of sensible heat in these gases is then $$\frac{410,000}{2} + 252.5 \times 120 \times 0.447 = 218,500 \text{ K. cal.}$$

or the temperature of these gases before entering the regenerator is 740° C.

It can be seen from the above that the re-cycled gases provide a considerable amount of heat. These temperatures have been also obtained in practical opertion of the generator plant.

The advantages to be derived from the re-cycling of water gas can be seen from the following calculation (in this case for the production of carburetted water gas. In using re-cycle gases the volume and sensible heat (or temperature) of the gases leaving the generator is increased and for this reason the decrease in temperature of these gases before leaving the generator is lower).

*Calculation for the production of carburetted water gases*

As shown in the former calculation the temperature and at the same time the sensible heat of the gases leaving the generator is high and for this reason can be advantageously used for at least the evaporation of the oil used for carburetting.

The following conditions and figures are assumed in addition to those in the previous calculation:

*Case I.*—Only evaporation of the oil, choosing the ratio of oil to gas so as to achieve a temperature of the mixture of 400° C.

*Case II.*—Cracking of the oil at a temperature of 730° C.

In both cases a gas oil is used having a specific gravity of 0.87 or a weight of 3.85 kgs. per gallon, the oil is pre-heated to 60° C. and the heat obtained from 1 gallon of cracked oil in the form of gas (about 2 cubic metres/gal.) is 35,000 K. cal.

The calorific value of the water gas produced is 2,800 K. cal./cubic metre.

*Case I*

Sensible heat in the re-cycle gases before mixing them with oil:

K. cal.
500×1080×0.328=177,500
50×1080×0.517= 27,500
―――――
205,000

Sensible heat in the re-cycle gases after mixing with oil and obtaining a mixture with 400° C.:

500×400×0.315=63,000
50×400×0.163= 9,000
―――――
72,000

Heat available for evaporation of the oil:

205,000−72,000=133,000 K. cal./cycle

Amount of oil evaporated:

$$3.85 \times \frac{133,000}{340} \times 0.47 = 216 \text{ gals./cycle}$$

After cracking the calorific value of the gas produced will be 1120 B. t. u./cubic feet and the consumption per 1000 cubic feet 6.8 Imperial gallons of oil.

*Case II*

Sensible heat in the re-cycle gases before cracking of the oil:

K. cals.
500×1080×0.328=177,500
50×1080×0.517= 27,500
―――――
205,000

Sensible heat in the re-cycle gases after cracking of the oil:

500×730×0.32=116,000
50×730×0.49= 18,000
―――――
134,000

Sensible heat available for cracking of the oil:

205,000−134,000=71,000 K. cal.

What I claim is:

1. A discontinuous process for the manufacture of water gas which comprises subjecting a generator containing a carbonaceous fuel bed to blowing with an oxygen-containing gas, heating a regenerator by passing a hot gas therethrough, and during the make run splitting the made gas issuing from the generator into two streams, mixing with one of said streams a gas rich in methane and at least one substance selected from the group consisting of steam and carbon dioxide, and passing the mixture thus obtained through the regenerator and then into the generator.

2. A discontinuous process for the manufacture of water gas which comprises subjecting a generator containing a carbonaceous fuel bed to blowing with an oxygen-containing gas, heating a regenerator by burning therein gas from a producer gas plant, and during the make run splitting the made gas issuing from the generator into two streams, mixing with one of said streams a gas rich in methane and at least one substance selected from the group consisting of steam and carbon dioxide, and passing the mixture thus obtained through the regenerator and then into the generator.

3. A discontinuous process for the manufacture of water gas which comprises subjecting a generator containing a carbonaceous fuel bed to blowing with an oxygen-containing gas, heating a regenerator by passing a hot gas therethrough, and during the make run splitting the made gas issuing from the generator into two streams, mixing with one of said streams coke oven gas and at least one substance selected from the group consisting of steam and carbon dioxide, and passing the mixture thus obtained through the regenerator and then into the generator.

4. A discontinuous process for the manufacture of water gas which comprises subjecting a generator containing a carbonaceous fuel bed to blowing with an oxygen-containing gas, heating a regenerator by passing a hot gas therethrough during the make run splitting the made gas issuing from the generator into two streams, mixing with one of said streams at least one substance selected from the group consisting of steam and carbon dioxide, and passing the mixture thus obtained through the regenerator and then into the generator and injecting oil into the other of said streams while the said stream has sufficient sensible heat at least to evaporate the oil.

5. A discontinuous process for the manufacture of water gas which comprises subjecting a generator containing a carbonaceous fuel bed to blowing with an oxygen-containing gas, heating a regenerator by passing a hot gas therethrough, and during the make run splitting the made gas issuing from the generator into two streams, mixing with one of said streams at least one hydrocarbon and at least one substance selected from the group consisting of steam and carbon dioxide, and passing the mixture thus obtained through the regenerator and then into the generator.

MICHAEL STEINSCHLAEGER.

REFERENCES CITED

The following references are of record in the file of this patent:

UNITED STATES PATENTS

| Number | Name | Date |
|---|---|---|
| 1,573,524 | Rose | Feb. 16, 1926 |
| 1,752,223 | Whitwell | Mar. 25, 1930 |
| 2,280,869 | Terzian | Apr. 28, 1942 |

FOREIGN PATENTS

| Number | Country | Date |
|---|---|---|
| 577,015 | Great Britain | May 1, 1946 |
| 578,332 | Great Britain | June 25, 1946 |